March 18, 1958     H. JACKSON     2,827,111
AUXILIARY SUPPORT FOR UPHOLSTERY SEATS
Filed June 11, 1956
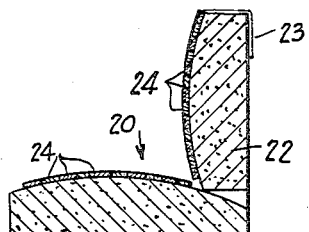
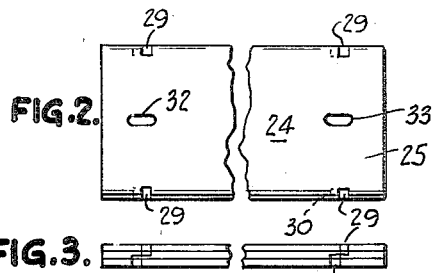
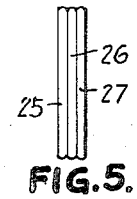
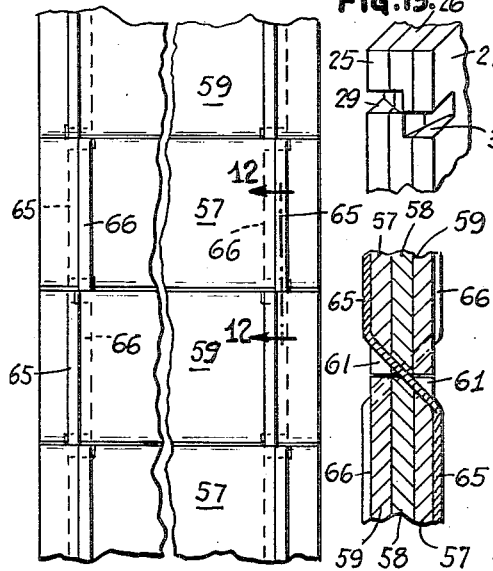
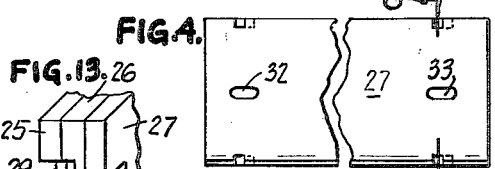
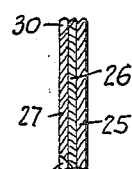
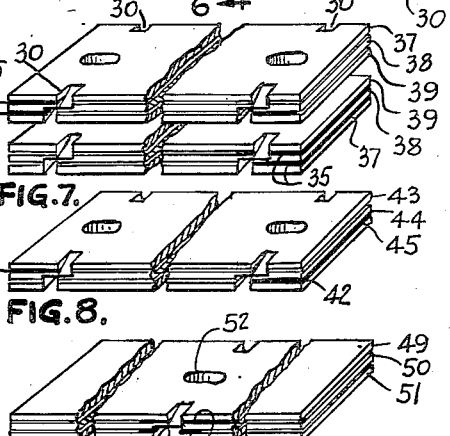
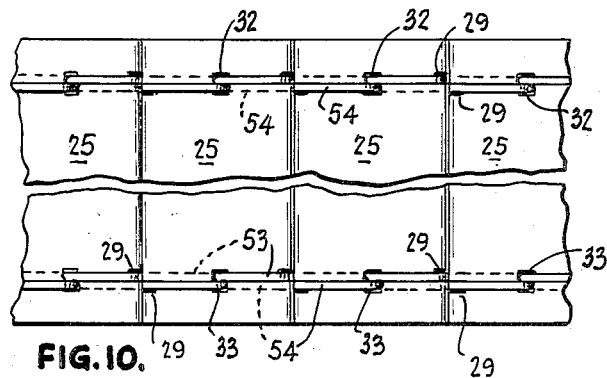
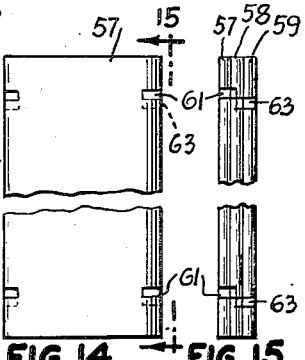
INVENTOR.
HARRY JACKSON.
BY *Percy Freeman*
ATTORNEY.

United States Patent Office 2,827,111
Patented Mar. 18, 1958

2,827,111

AUXILIARY SUPPORT FOR UPHOLSTERY SEATS

Harry Jackson, Brooklyn, N. Y.

Application June 11, 1956, Serial No. 590,486

10 Claims. (Cl. 155—182)

This invention relates to auxiliary supports for upholstered seats and, more particularly, to auxiliary supports that are adapted to distribute the weight of a body over a large surface area of the upholstered cushions, and to such auxiliary support which is articulated in one direction and slightly flexible in a transverse direction.

Various types of auxiliary supports have been proposed for upholstered seats, such as automobile seats, in which the weight is distributed over an enlarged surface area so as to prevent so-called "sinking" into the cushions. While relatively stiff and unyielding supports are effective for this purpose, there is much left to be desired for the comfort of the rider during normal use. On the other hand, such supports that are not sufficiently rigid defeat the purposes intended. An object of this invention, therefore, is to provide an auxiliary support for upholstered seats that is articulated in the direction of contour of the cushion but which is sufficiently rigid in a direction transversely thereto so as to apportion the weight on the support over an enlarged surface area of the cushion.

Another object of this invention is to provide an auxiliary support for upholstered seats that will readily follow the contour of substantially any cushion on which it is placed that is simple in construction, efficient in operation, and which will overcome the aforementioned difficulties.

Still another object of this invention is to provide an articulated auxiliary support for upholstered cushions that is quite flexible in a direction following the contour of the cushion but which is only slightly yieldable in a direction transversely thereto.

Still a further object of this invention is to provide an auxiliary support for upholstered seats, that is constructed of a plurality of individual laminated slat assemblies, each of which includes a plurality of independent slat elements adapted for limited yieldable movement relative to each other.

All of the foregoing and still further objects and advantages of this invention will become apparent from a study of the following specification, taken in connection with the accompanying drawings, wherein:

Fig. 1 is a cross-sectional view of an upholstered seat having an auxiliary support made in accordance with this invention in operative association therewith.

Fig. 2 is a top plan view of one form of slat assembly made in accordance with this invention.

Fig. 3 is a front view of the assembly shown in Fig. 2.

Fig. 4 is a bottom plan view of the assembly shown in Fig. 2.

Fig. 5 is an end view of the assembly shown in Fig. 2.

Fig. 6 is a cross-sectional view taken along line 6—6 of Fig. 4.

Fig. 7 is an exploded view, in perspective, showing two adjacent slat assemblies of a modified form of this invention.

Fig. 8 is a perspective view showing a still further modified form of this invention.

Fig. 9 is an end view, in perspective, of still another modified form of this invention.

Fig. 10 is a top plan view of a plurality of slat assemblies secured together in an articulated fashion by means of associated cord elements.

Fig. 11 is a top plan view of a plurality of slat assemblies secured together in an articulated fashion, in a modified manner and by means of associated strap elements.

Fig. 12 is a cross-sectional view taken along line 12—12 of Fig. 11.

Fig. 13 is a partial perspective view showing the kerfs in the ends of the slat assembly shown in Fig. 2, which engage the associated cord elements, when assembled in the manner shown in Fig. 10.

Fig. 14 is a top plan view of a slat assembly used in the articulated assembly shown in Fig. 11.

Fig. 15 is an end view taken alonge line 15—15 of Fig. 14.

Referring now to Fig. 1 of the drawing, one auxiliary support assembly 20 made in accordance with this invention is shown in assembled position with an upholstered seat cushion 21 and another similar assembly in association with an upholstered back rest 22. If desired, each such assembly 20 may be secured to the respective cushion by means of a tape 23 or other similar fastening means. The support assembly includes a plurality of similar slat assemblies 24 that are hingedly connected in an articulated fashion so as to readily follow the contour and shape of the respective seat portions.

Referring to Figs. 2 through 6, one form of laminated slat assembly 24 is shown to include a top slat 25, a middle slat 26 and a bottom slat 27, all of which are of similar shape, size, and construction, that are adapted to be placed in sliding engagement with each other. When so disposed, each edge is provided with a pair of cord-receiving kerf sections that provide a means for securing a plurality of such assemblies 24 in assembled position, with their adjacent edges in engagement with each other. The top slat 25 has four downwardly and outwardly extending kerfs 29 that also extend through approximately one-half the thickness of the middle slat 26, as more clearly shown in Fig. 13. The bottom slat 27 is also provided with four kerfs 30 that extend upwardly and outwardly and adjacent to the respective kerfs in the upper slat 25, which kerfs also extend through approximately one-half the thickness of the middle slat 26. These various kerfs are provided to facilitate the assembly of adjacent slat units in a manner hereinafter described. Each slat assembly 24 is also provided with a pair of oval-shaped bores 32, 33, that extend perpendicularly therethrough for purposes also hereinafter described. Because of the ability of each slat 25, 26, 27, to slide longitudinally relative to each of the others, each slat is able to flex independently of the others such that the assembled unit is much more flexible in a longitudinal direction than if the three slats were integrally connected. Accordingly, when a plurality of these slat assemblies are secured together to form a support as shown in Fig. 1, they will distribute the weight exerted thereon over a large surface of the respffective cushion, but will also yield substantially in their respective longitudinal directions. Preferably, the assembled support should be of sufficient width to accommodate one person.

Referring now to Fig. 7, a modified form of the present invention is shown wherein the three slats 37, 38, 39, are secured together at one end thereof by means of cement 35 while the opposite ends thereof are not so connected. While this method of assembly still allows for substantial flexibility longitudinally of each respective slat assembly, the flexibility is not as great as in the aforementioned modification wherein the slats are slidable relative to each other. In order to provide for uniform flexibility throughout the length of the assembled slat units, each slat assembly is so arranged relative to the next adjacent slat assembly so that a cemented end on one assembly is placed in association with the free end of the next assembly. Alternating in this way, the resiliency of the entire assembly is distributed more uniformly from one side to the other. A pair of cord or tape receiving openings are also provided in this assembly and extend perpendicularly therethrough to receive associated cords or tape as will hereinafter be described. Similarly, edge kerfs are also provided to receive these cords or tapes in the manner hereinbefore set forth.

A still further modified form of this invention is shown in Fig. 8 wherein a layer of cement is provided between the top and middle slats 43, 44, at one end of the assembly and a similar layer of cement 42 is provided between the middle slat 44 and the bottom slat 45 along the opposite end thereof. This arrangement also provides a more limited degree of longitudinal flexibility for each slat, but more evenly distributes the flexibility throughout the length of each single assembly. In assembling the support, these slat assemblies are similarly alternated so that the end of a slat assembly having the cement disposed between the top and middle slats will be adjacent to the end of the next subsequent slat assembly having the layer of cement disposed between the middle and bottom slats thereof. A pair of oval-shaped bores are also provided along the center line of each such assembly for receiving the cords or tapes that are used to thread the plurality of slat assemblies together. Similarly, respective kerfs are also provided adjacent each edge of the slat assembly for receiving the cord or tape in the manner hereinbefore described.

As shown in Fig. 9, a still further modified form of this invention is shown to comprise a slat assembly having a top, middle, and bottom slat 49, 50, 51, secured together by means of a layer of cement 48 intermediate the respective ends thereof. This relationship maintains the central portions of the respective slats in fixed position relative to each other while permitting the outer extremities thereof to flex independently of each other. Accordingly, a single oval-shaped bore 52 is provided in the vicinity of the center of the assembly so as to receive associated cords or tapes therethrough for threading a plurality of such slat assemblies in an assembled position. Therefore, only a single kerf section is required along each edge of this slat assembly so as to accommodate the single type of threading arrangement used therewith.

As more clearly shown in Fig. 10 of the drawing, the slat assemblies made in accordance with the various modifications shown in Figs. 2 through 8, are threaded together by means of a pair of cords 53, 54, at each end thereof. Going from right to left, as viewed in the drawing, one cord 53 is passed over the top of the slat assembly, downwardly through the oval-shaped bore 32 and along the bottom surface thereof and up through one side of an associated kerf in the assembly into engagement with an oppositely disposed kerf in the next subsequent slat assembly over the top surface thereof and into the oval-shaped opening provided therein. The other cord 54 passes through the associated openings and kerfs in the same manner except that it is out of phase with the first cord 53, in that this cord 54 passes under the slat assembly as the other cord 53 passes thereover. The opposite ends of the various slat assemblies are secured in the same manner by their respective cords 53, 54. These cords are drawn as tightly as possible so that substantially no space is left between adjacent slat assemblies, whereby they are closely knit and yet completely articulated so that they may be folded in one direction or another to enable the unit to readily follow the contour of a cushion in the manner shown in Fig. 1. Insofar as the modified form of the invention shown in Fig. 9 is concerned, these slat assemblies are threaded together by a single pair of cords which alternately pass over and under adjacent units through the centrally disposed bore 52.

Referring now to Figs. 11, 12, 13, and 14, a modified arrangement for threading the respective slat assemblies together is shown wherein it is not necessary to provide cord or tape receiving bores perpendicularly through the respective slat assemblies. In this case, each slat assembly includes a top slat 57, middle slat 58, and bottom slat 59, that may be assembled in any of the aforementioned ways described in connection with the assemblies disclosed in Figs. 2 through 8. The slat assembly 55 is provided with a pair of kerf sections along each edge thereof, each section having a pair of offset kerf portions 61, 63, which are adapted to receive tapes 65, 66, therein. As more clearly shown in Figs. 11 and 12, the pair of tapes 65, 66, at each side of the respective slat assembly 55 alternately pass above and below the assembly and are received in their respective kerf sections along each edge thereof so that they are closely fitted together and yet provided with maximum articulated movement. As shown in Fig. 12, one tape 65 passes over the top 57 of one slat assembly and then under the next slat assembly whereas the adjacent tape 66 passes beneath the first such slat assembly, and then over the next adjacent slat assembly.

It will be recognized that while cords are shown in threaded engagement with the respective slat assemblies 25 in Fig. 10, and tapes are shown in connection with the assembly of the slat units shown in Figs. 11 and 12, that each may be used in any of the assemblies as a matter of choice, the use of cord or tape being one of expediency. Similarly, while wood has been found to be quit satisfactory for the construction of each slat member, various other materials having similar properties may be substituted therefor without departing from the spirit of this invention.

While this invention has been described with particular reference to the specific forms shown in the drawing, it is to be understood that such is not be construed as imparting limitations upon the invention, which is best defined by the claims appended hereto.

Having thus described my invention, what I claim as new and desire to secure by Letters Patent, is:

1. An auxiliary support for upholstered seats comprising a plurality of articulated slat assemblies, each said slat assembly comprising a plurality of flat longitudinal slats disposed in a stacked relationship with each other, at least a portion of each of said slats being flexible independently of the other of said slats in said assembly.

2. An auxiliary support as set forth in claim 1, wherein each said slat is slidably engaged with each next adjacent slat, each said slat being entirely flexible independently of said other slats.

3. An auxiliary support as set forth in claim 1, wherein each said slat of each assembly comprises a first and a second end, each said slat being connected to the next adjacent slat alternately at said first end and said second end and being independently flexible relative to each next adjacent slat at alternately opposite ends.

4. An auxiliary support as set forth in claim 1, wherein each said slat of each assembly is connected to the next adjacent slat intermediate the ends thereof.

5. An auxiliary support as set forth in claim 1, wherein each said slat of each assembly comprises a first and a second end, each said slat being connected to the next adjacent slat at said first end thereof, all of said slats in each assembly being interconnected at said first end and being independently flexible at said second end.

6. An auxiliary support as set forth in claim 2, wherein each said assembly is provided with articulated hinge means adapted to be hingedly secured to each next adjacent slat assembly.

7. An auxiliary support as set forth in claim 5, wherein a plurality of said slat assemblies are hingedly connected together with said first end of each assembly opposing said second end of each next adjacent assembly.

8. An auxiliary support for upholstered seats comprising, in combination, a plurality of laminated slat assemblies, flexible means hingedly securing said slat assemblies together, each said slat assembly comprising a first and second longitudinal edge and an upper and a lower surface, said slat assemblies being arranged with the first edge of one assembly opposing the second edge of said next assembly, said flexible means being adapted to alternately engage the upper surface of one assembly and the lower surface of the next adjacent assembly, said opposed first and second edges of adjacent slat assemblies defining a kerf, and said flexible means passing through said kerfs from one assembly to the next adjacent assembly.

9. An auxiliary support as set forth in claim 8, wherein said flexible means comprises a pair of adjacent flexible members, one of said members laternately engaging the upper and lower surfaces of adjacent assemblies, and the other of said members alternately engaging the lower and upper surfaces of said adjacent assemblies.

10. An auxiliary support as set forth in claim 8, wherein each said assembly comprises a bore intermediate said first and second edges, said flexible means comprising a pair of flexible members, one of said members being adapted to alternately pass from an associated kerf over an upper surface of one of said assemblies as the other of said members passes from an associated kerf over the lower surface of said assembly, and both of said flexible members extending through said bore in opposite directions to engage the opposite surfaces of said assembly.

References Cited in the file of this patent
UNITED STATES PATENTS

| | | |
|---|---|---|
| 2,404,257 | Thomas | July 16, 1946 |
| 2,745,473 | Boland | May 15, 1956 |